United States Patent [19]
Koch et al.

[11] Patent Number: 5,368,520
[45] Date of Patent: Nov. 29, 1994

[54] APPARATUS AND METHOD FOR SEPARATING WINGS AND ATTACHED BREASTS FROM POULTRY CARCASSES

[76] Inventors: Jay Koch, 177 Ocean Shore Dr., Key Largo, Fla. 33037; Andrew C. Estes, 211 Widgeon Rd., Russellville, Ark. 72801

[21] Appl. No.: 182,461

[22] Filed: Jan. 18, 1994

[51] Int. Cl.$^5$ .............................................. A22C 21/00
[52] U.S. Cl. ................... 452/165; 452/149; 452/136; 452/166; 452/169
[58] Field of Search ............ 452/165, 149, 166, 170, 452/135, 136, 169

[56] References Cited

U.S. PATENT DOCUMENTS

| | | | |
|---|---|---|---|
| 4,023,237 | 5/1977 | Meyn | 17/11 |
| 4,155,146 | 5/1979 | Meyn | 17/11 |
| 4,177,570 | 10/1978 | Meyn | 17/11 |
| 4,207,653 | 6/1980 | Grasbarro | 17/11 |
| 4,503,587 | 3/1985 | Martin | 17/52 |
| 4,558,490 | 12/1985 | Hazenbroek et al. | 452/165 |
| 4,563,791 | 1/1986 | Martin et al. | 17/11 |
| 4,597,136 | 7/1986 | Hazenbrock | 17/52 |
| 4,648,155 | 3/1987 | Burnett | 17/46 |
| 4,648,156 | 3/1987 | Meyn | 452/136 |
| 4,651,383 | 3/1987 | van der Erden | 17/11 |
| 4,769,872 | 9/1988 | Hazenbrock et al. | 17/52 |
| 4,873,746 | 10/1989 | Scheier et al. | 452/169 |
| 4,920,610 | 5/1990 | Callsen et al. | 17/11 |
| 4,937,918 | 7/1990 | Martin | 17/11 |
| 4,993,114 | 2/1991 | Meyer et al. | 452/136 |
| 4,993,115 | 2/1991 | Hazenbrock | 452/169 |
| 5,083,974 | 1/1992 | Martin | 452/169 |
| 5,176,564 | 1/1993 | Hazenbrock | 452/169 |
| 5,199,922 | 4/1993 | Korenberg et al. | 452/122 |
| 5,269,722 | 12/1993 | Diesing et al. | 452/135 |
| 5,312,291 | 5/1994 | van Den Nieunelaar et al. | 452/169 |
| 5,314,374 | 5/1994 | Koch et al. | 452/149 |

*Primary Examiner*—Willis Little
*Attorney, Agent, or Firm*—Ray F. Cox

[57] ABSTRACT

Apparatus and method for separating wings and attached breast from poultry carcasses comprising prescoring the flesh of the poultry carcass over the shoulder joint, separating the wing from the poultry carcass at the shoulder joint using a rotating cup knife having a broadly wedge shaped cutting edge, cutting along the scapula bone so as to separate tendons which tend to bind a portion of the breast meat to the poultry carcass and partially tearing the wing portion and attached breast portion including the "eye" and the flesh in the vicinity of the wishbone from the poultry carcass. The apparatus comprises separate processing stations for accomplishing each of the separation steps. The apparatus is designed to be used in conjunction with a moving conveyor belt having mandrels upon which the front half of a poultry carcass is mounted.

15 Claims, 10 Drawing Sheets

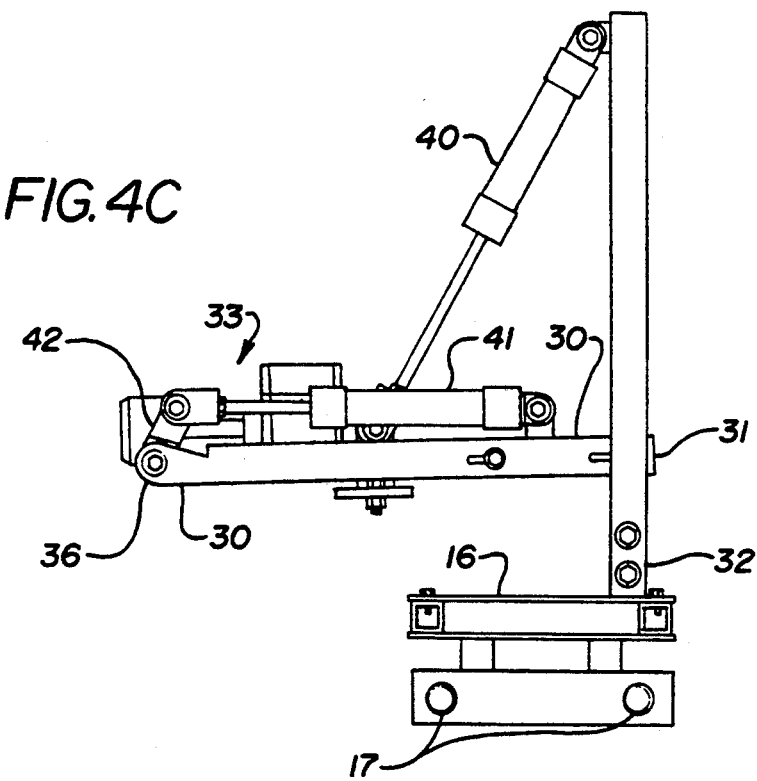
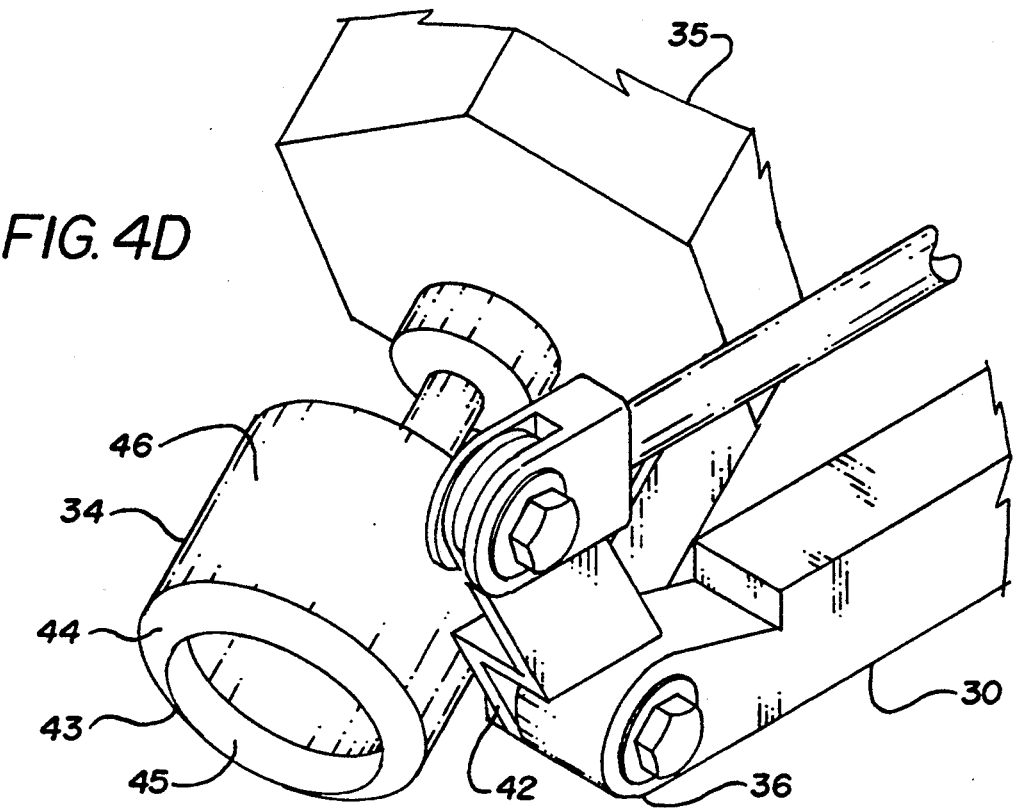

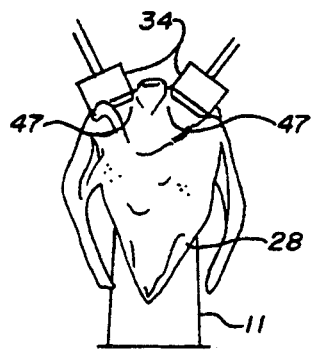
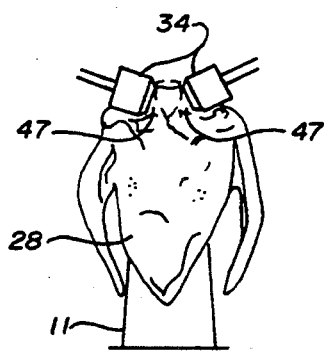
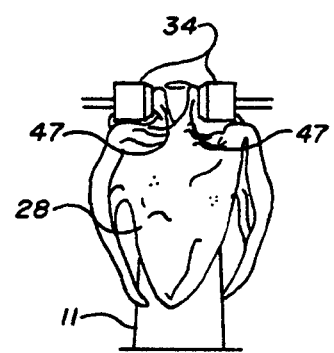
FIG. 5A     FIG. 5B     FIG. 5C
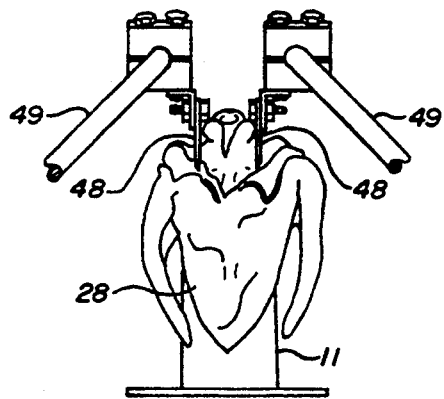
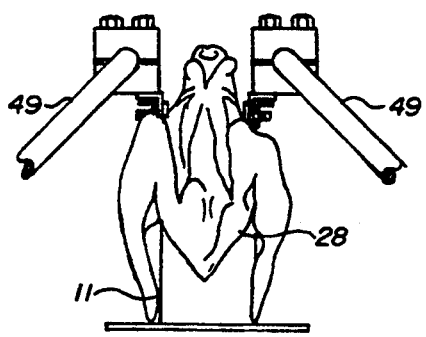
FIG. 7A     FIG. 7B

APPARATUS AND METHOD FOR SEPARATING WINGS AND ATTACHED BREASTS FROM POULTRY CARCASSES

BACKGROUND OF THE INVENTION

The present invention relates to an apparatus and method for processing poultry carcasses and in particular to the separation of wings and breasts from poultry carcasses.

In the processing of poultry carcasses, it is important that the wings and breasts be separated from the poultry carcass with minimal loss and damage to useable portions of meat and assurance that the useable meat is not contaminated with bone residues.

The prior art discloses a form of poultry processing apparatus in which the front half of a poultry carcass is placed upon a cone shaped mandrel which is advanced by a moving conveyor past a variety of processing stations. An apparatus of this type is disclosed in U.S. Pat. No. 4,937,918 issued to Martin on Jul. 3, 1990 for "Inline Breast Deboner." In this type of apparatus the mandrel provides a steady rigid position on which the poultry carcass can be placed with sufficient precision for Manual cutting to proceed with further processing of the poultry carcass. The front half of the poultry carcass includes the wings, breast, back, rib cage and scapula. In addition, there is a keel bone and lying along the keel bone are the tenderloins or tenders. To complete the processing of the poultry carcass, it is necessary to separate the wing from the carcass at the shoulder joint, to tear the breast from the poultry carcass while retaining with the breast as much of the useable meat as is possible, removing the tenders from each side of the keel bone, and cutting the wings from the breast.

In addition to the problem of assuring that all of the poultry breast meat is removed from the poultry carcass, a significant problem occurs in the separation of the wing from the carcass at the shoulder joint. The shoulder joint comprises a ball and socket and is surrounded by a number of strong tendons and in particular the wing tendons. In separating the shoulder joint, it is important that the major tendons binding the wing to the poultry carcass be completely severed. In doing so, however, it is important to avoid cuts that would tend to leave portions of the breast meat remaining attached to the carcass and to avoid cutting through the bones of the shoulder joint. A cut made into the bone of the shoulder joint can result in the formation of bone chips or the release of bone marrow, either situation resulting in the loss of quality of the processed meat.

Many of the prior art techniques for separating the wing from the poultry carcass at the shoulder joint rely on the use of rotating circular knives. The rotating circular knives are also used in conjunction with straight knives to assist in the separation process. Examples of both combinations are found in U.S. Pat. No. 4,920,610, U.S. Pat. No. 5,176,564, U.S. Pat. No. 4,993,115, U.S. Pat. No. 4,769,872, U.S. Pat. No. 4,651,383, U.S. Pat. No. 4,597,136, U.S. Pat. No. 4,563,791 and U.S. Pat. No. 4,503,587.

To assist in correctly positioning the shoulder joint for severing the wing from the poultry carcass, various methods have been suggested in the prior art. For example, U.S. Pat. No. 4,207,653 issued to Gasbarro on Jun. 17, 1980 for "Automatic Wing Cutting Apparatus" discloses a rotatable drum-like wing retaining member with spaced wing receiving grooves along the outer surface. Spaced slots in the retaining member contain knives for selectively severing the wing at desired locations. U.S. Pat. No. 5,083,974 issued to Martin, et al. on Jan. 28, 1992 for "Turkey Breast Deboner" discloses a rest having a relief in its upper surface to locate the shoulder joint. A rotary cup knife is then used to separate the wing from the breast. Both Gasbarro and Martin are directed to the problem of cutting the wing from the breast fillet. Neither addresses the problem outlined above of separating the wing from the poultry carcass at the shoulder joint without damage to useable meat.

The use of a rotary cup knife to separate the wing from the poultry carcass is not disclosed in the prior art. As noted above, U.S. Pat. No. 5,083,974 discloses the use of a rotary cup knife to separate a poultry wing from the attached poultry breast after the combination of the wing and attached breast have been removed from the poultry carcass.

Various disclosures in the prior art have been directed to the use of a rotary cup or cylindrical knife in processing animal carcasses. Typically such rotary cylindrical or cup knives have been used in removing the anus or vent from a slaughtered animal. Typical examples of the prior art are found in U.S. Pat. No. 5,199,922, U.S. Pat. No. 4,117,570, U.S. Pat. No. 4,023,237 and U.S. Pat. No. 4,155,146. The prior art disclosures have not, however, been directed to the use of a rotary cup knife in the separation at the shoulder joint of a wing from a poultry carcass.

As discussed above, the removal of a wing and attached breast portion from a poultry carcass commences with the separation of the wing from the poultry carcass at the shoulder joint, an operation presently performed by hand. Separation of the wing and attached breast from the poultry carcass can be accomplished by tearing away the connections between the breast and the poultry carcass as disclosed in Martin's '918 patent. It is important for the successful accomplishment of this step, however, that the cuts made in preparation for the final tearing operation be made so as to ensure that the maximum amount of useable breast meat is removed from the carcass. An example of the prior art in this area is U.S. Pat. No. 4,648,155 issued to Burnett on Mar. 10, 1987 for "Chicken Deboning Apparatus and Method."

SUMMARY OF THE INVENTION

In order to maximize the efficiency of removal of useable meat from the poultry carcass and further to ensure the quality of the meat produced thereby, the method and apparatus of the present invention employs a series of processing steps. The primary step is the separation of the wing from the poultry carcass at the shoulder joint. A rotating cup knife is employed for this purpose. The cup knife is cylindrical in shape with a cutting edge that is formed by relatively flat bevels. The cutting edge thus produced is broadly wedge-shaped in cross section. As a result the cup knife, when properly positioned in the shoulder joint, is able to both sever the flesh and tendons in the vicinity of the shoulder joint while wedging apart the ball and the socket which together make up the shoulder joint. The cup knife is positioned in the shoulder joint and the actual cut through the shoulder joint is made by a swinging arc-like motion of the cup knife so as to minimize the amount of useable meat remaining attached to the poultry carcass.

In order to ensure that the cup knife acts to sever the shoulder joint in the proper location without damaging the ends of the bones making up the shoulder joint, a prescoring step may be employed. In the prescoring step, the shoulder joints are located by a guide block which directs a knife precisely to the correct spot on the shoulder joint to receive a score across the flesh over the shoulder joint. The knife may be either a fixed straight knife or a rotating circular knife. By scoring the flesh over the shoulder joint, the weight of the wing tends to allow the shoulder joint to open slightly, thereby assuring entry of the cup knife at the proper location.

Following the separation of the shoulder joint by the cup knife, the wing remains attached to the breast which in turn remains attached to the poultry carcass. The wing and attached breast portion could be torn away from the poultry carcass at this point. However, because certain tendons remain which attach the breast to the poultry carcass, tearing the breast from the poultry carcass at this point would result in the loss of certain portions of the breast meat which would remain attached to the poultry carcass. Such meat is greatly diminished in value. In order to maximize the efficiency of the breast removal step, an additional step is inserted following separation of the shoulder joint by the cup knife. A pair of fixed, straight knife blades are positioned so as to slice down along the scapula bone so as to separate the remaining tendons which tend to bind a portion of the breast meat firmly to the poultry carcass.

As a final step, the remaining connections between the breast and the poultry carcass may be partially separated in such a way as to maximize meat release from the carcass by guiding the wing through a pair of guide bars which gradually diverge from the path of the poultry carcass along the moving conveyor. The wing is thus gradually pulled away from the poultry carcass so as to obtain good release of meat from the area of the wishbone and to pull a portion of meat known as the "eye" from an opening under the wing. Prior art methods may leave a quantity of high quality meat on the carcass in these areas rather than removing this meat with the breast and thereby greatly increasing its value.

BRIEF DESCRIPTION OF THE DRAWINGS

FIG. 4c is an elevation view of a shoulder separator assembly immediately after completing a cut through a shoulder joint.

FIG. 4d is a perspective view of the cup knife.

FIGS. 5a, 5b and 5c are sequential front elevation views of the cup knife cutting through the shoulder joint of a poultry carcass positioned on a mandrel.

FIGS. 7a and 7b show sequential front elevation views of a poultry carcass on a mandrel before and after the scapula knives have made cuts along the scapula bone.

DETAILED DESCRIPTION OF THE PREFERRED EMBODIMENTS

Figure 1:
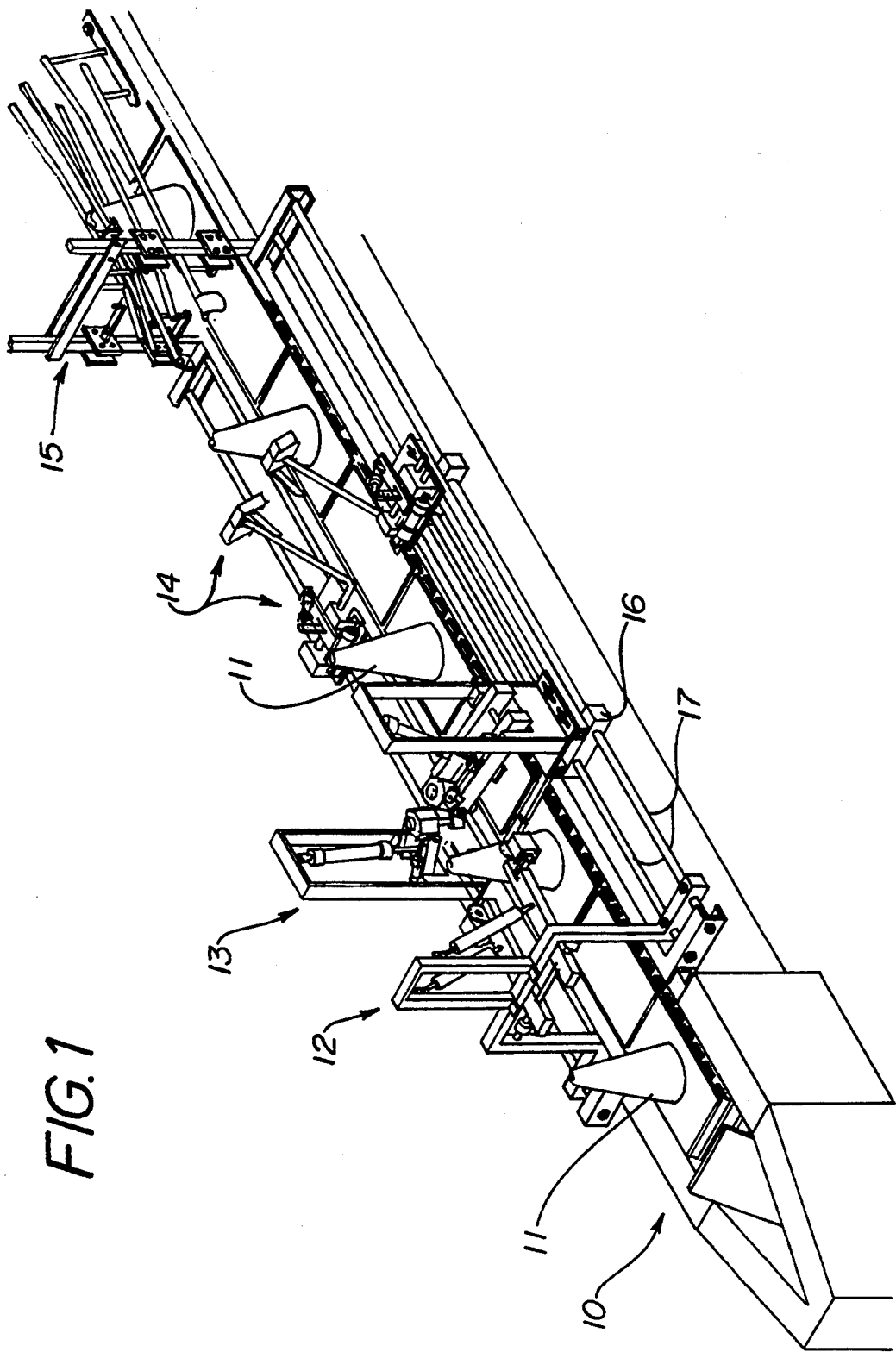
FIG. 1 is a perspective view of the present invention showing all four processing steps.

An overview of the present invention is described with reference to FIG. 1. The prior art discloses a moving conveyor 10 for use in poultry processing. The moving conveyor 10 is provided with a plurality of cone-shaped mandrels 11, which are carried by the moving conveyor 10 along a defined path which passes by various processing stations. A moving conveyor 10 of the type described is disclosed in U.S. Pat. No. 4,937,918 which is incorporated herein by reference.

The front half of a poultry carcass consisting of the back, rib cage, scapula, breast and wings is placed in an upright position on the mandrel 11. The poultry carcass is arranged so that its back is facing the direction of movement of the moving conveyor 10. In the preferred embodiment of the present invention, the mandrel 11 carrying a poultry carcass first passes through a prescore assembly 12. The prescore assembly 12 scores the flesh over the shoulder joints of the poultry carcass. Next the poultry carcass passes through the shoulder joint separator assembly 13. Here the shoulder joint, which comprises a ball and socket joint, where the ball is found on the wing and the socket is found on the poultry carcass, is separated as described more fully below. Next, the mandrel 11 and poultry carcass pass through the scapula blade assembly 14. Here an additional cut is made along the scapula bone so as to assist in the final separation of the wing and attached breast from the poultry carcass. In the breast separator assembly 15 the wing is received by a pair of guide rods which pull the wings downward in relation to the poultry carcass as the poultry carcass is advanced along the moving conveyor 10. A degree of outward pull may also be desirable. The result of this operation is to partially separate the wing and attached breast from the poultry carcass so as to maximize the amount of usable meat removed from the carcass. The complete separation of the breast from the carcass by tearing the remaining connections between the breast and poultry carcass may be accomplished by subsequent processing already known in the art. Following this point the tenders or fillets may be removed from either side of the keel bone of the poultry carcass and the wing and breast may undergo further processing.

The shoulder joint separator assembly 13 and the scapula knife assembly 14 are mounted on a carriage 16 which is able to slide freely along slide rods 17 forward and backward relative to the motion of the moving conveyor 10. By a mechanism to be described more fully below, the joint separator assembly 13 and the scapula knife assembly 14 are synchronized to the motion of each mandrel 11 while its respective operation is being performed. At the completion of each operation, the carriage 16 is returned to a starting position in line with the next mandrel 11 and the cycle repeats.

The prescore assembly 12 is fixed and does not move with the motion of the moving conveyor 10. The operation of the prescore assembly 12 is described with respect to FIGS. 2a, 2b, 3a, 3b and 3c. The function of the prescore assembly 12 is to assist in opening up the shoulder joint for separation at the shoulder joint separator assembly 13 following. If the shoulder joint separator assembly 13 functions adequately to separate the shoulder joint without unacceptable damage to the meat and without unacceptable loss of meat, the prescore assembly 12 may be eliminated. It has been found, however, that the efficiency of the shoulder separation operation may be enhanced by prescoring the flesh over the shoulder joint. This operation allows the shoulder joint to separate slightly under the weight of the wing. As a result the efficiency of the shoulder joint separation may be enhanced.

In order to efficiently score the flesh over the shoulder joint at the appropriate position, it is important that the scoring operation take place in a very precise manner. Accordingly, and with reference to FIG. 2a, the prescore assembly 12 comprises a pair of guide blocks 18. The guide blocks 18 are mounted by their respective forward ends 19 to a mounting rod 20 supported by a support assembly 21. The guide blocks 18 are mounted at approximately the position at which the shoulder joints of a poultry carcass mounted upon a mandrel 11 would be encountered as the mandrel 11 is advanced along the moving conveyor 10.

The guide blocks 18 are mounted along the forward ends 19 such that the guide blocks 18 are provided with a limited freedom to move transversely to adjust for typical variations in the size of the poultry carcass. In other words, the shoulder joints might be spaced somewhat more narrowly or more widely than the average so that the guide blocks 18 must likewise have a similar degree of freedom in their transverse position. Likewise, since the guide blocks 18 are pivoted at their forward ends 19, they are allowed a degree of limited freedom to move vertically to accommodate variations in the height of the shoulder joints of a particular poultry carcass. Each of the assemblies 12, 13, 15 are provided with means of positioned adjustment which may be made manually to assure efficient operation. Such means of adjustment are well known in the art.

The rearward ends 22 of the guide blocks 18 receive the prescore knife 23. In the preferred embodiment of the present invention, the prescore knives 23 are rotary circular knives driven by rotary actuators 24. In an alternative embodiment of the present invention, the prescore knives 23 may be straight, fixed knives mounted on the rearward ends 22 of the guide blocks 18.

Figure 2A:
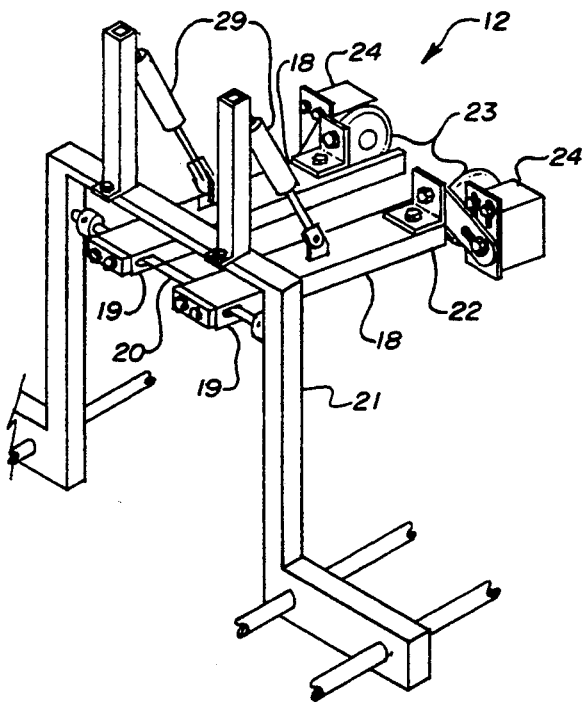
FIG. 2a is a perspective view of the prescore apparatus.
Figure 2B:
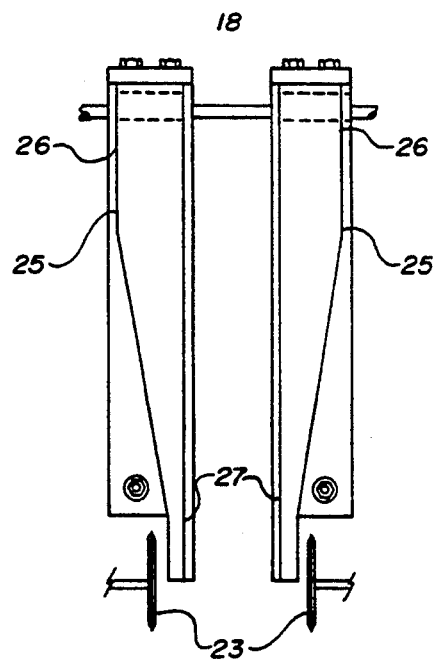
FIG. 2b is a partial view of the prescore apparatus showing a plan view of the underside of the guide blocks.
Figure 3A:
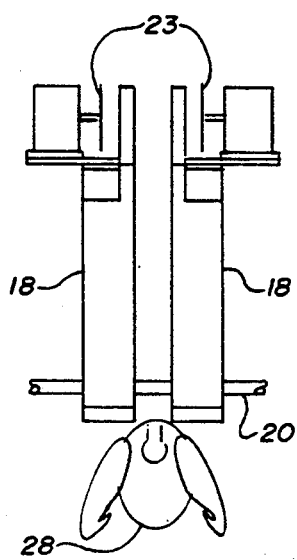
FIGS. 3a, 3b and 3c show the sequential motion of a poultry carcass in plan view as it passes through the guide blocks to the circular knives which score the shoulder joints.
Figure 3B:
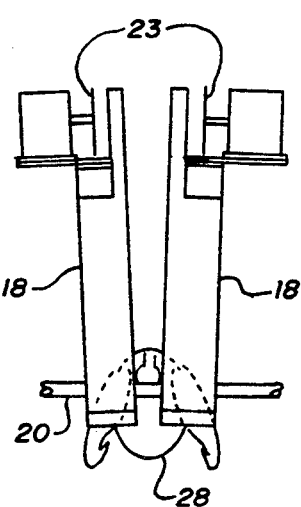
Figure 3C:
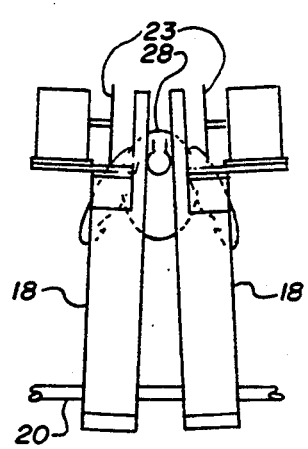

Referring to FIG. 2b the guide blocks 18 are each provided with a milled recess 25. The milled recess 25 is provided with a wide entry area 26. The wide entry area 26 is wide enough to receive the shoulder joints of widely varying sizes of poultry carcasses. The milled recess 25 narrows down to a narrow exit area 27. The prescore knife 23 is positioned in the narrow exit area 27. Therefore, in operation the poultry carcass mounted on the mandrel 11 is advanced by the moving conveyor toward the prescore station 12. The shoulder joints, which are disposed on the upper portions of the poultry carcass, first encounter the wide entry area 26 of the milled recess 25 on the underside of the guide blocks 18. As the poultry carcass continues to advance, the shoulder joint rides within the milled recess area 25. Due to the freedom of movement of the guide blocks 18, the guide blocks 18 move in response to, and in accommodation with, varying placements of the shoulder joints on the poultry carcass. As the poultry carcass continues to advance along the moving conveyor 10, the shoulder joints are confined to the narrow exit area 27. As the poultry carcass passes through the narrow exit area 27, the flesh above the shoulder joints is scored by the prescore knife 23. Adjustable downward pressure may be applied to the prescore knife 23 as necessary to ensure that the cut is to the correct depth. The manner in which the guide blocks 18 move to accommodate a typical poultry carcass 28 is shown in FIGS. 3a, 3b and 3c.

Once the initial scoring has been made, it is important that the prescore knives 23 not be allowed to penetrate too deeply into the shoulder joint. Approximately ¼ inches has been found to be effective. Accordingly, pneumatic actuators 29 as shown in FIG. 2a are employed to lift the prescore knives 23 out of the path of the poultry carcass 28 and to prevent damage to valuable breast meat. The timing of operation of the pneumatic actuators 29, or of other actuators described below, may be performed by any electrical or mechanical means well known in the art.

The shoulder separator assembly 13 is described with reference to FIGS. 4a, 4b, 4c and 4d. Following the prescore operation, the shoulder separation is achieved by the shoulder separator assembly 13. The shoulder separator assembly 13 comprises a shoulder separator arm 30 pivotally mounted at a first end 31 to a support 32 which is rigidly affixed to the carriage 16. As described above, the carriage 16 is free to slide parallel to the direction of motion of the moving conveyor 10 along slide rods 17.

A cup knife assembly 33, comprising a cup knife 34 and a rotary motor 35 for driving the cup knife 34 in rotary motion, is pivotally attached to a second end 36 of the shoulder separator arm 30.

Figure 4A:
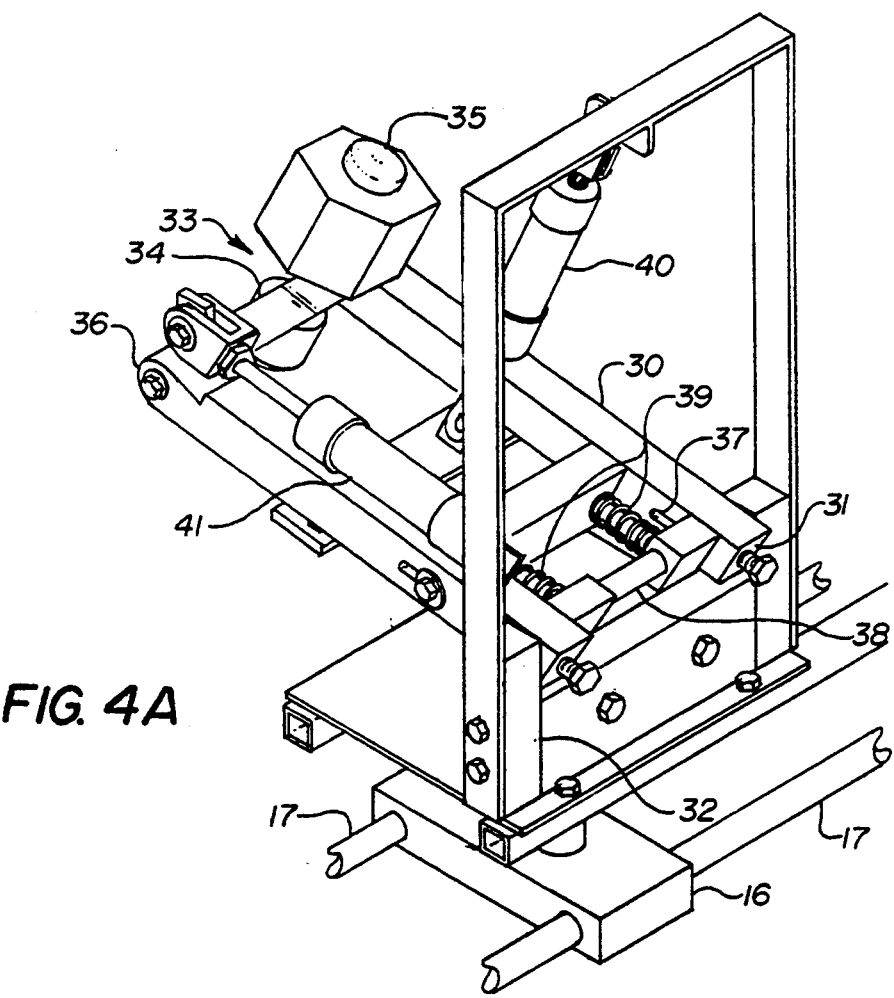
FIG. 4a is a perspective view of a shoulder separator assembly.
Figure 4B:
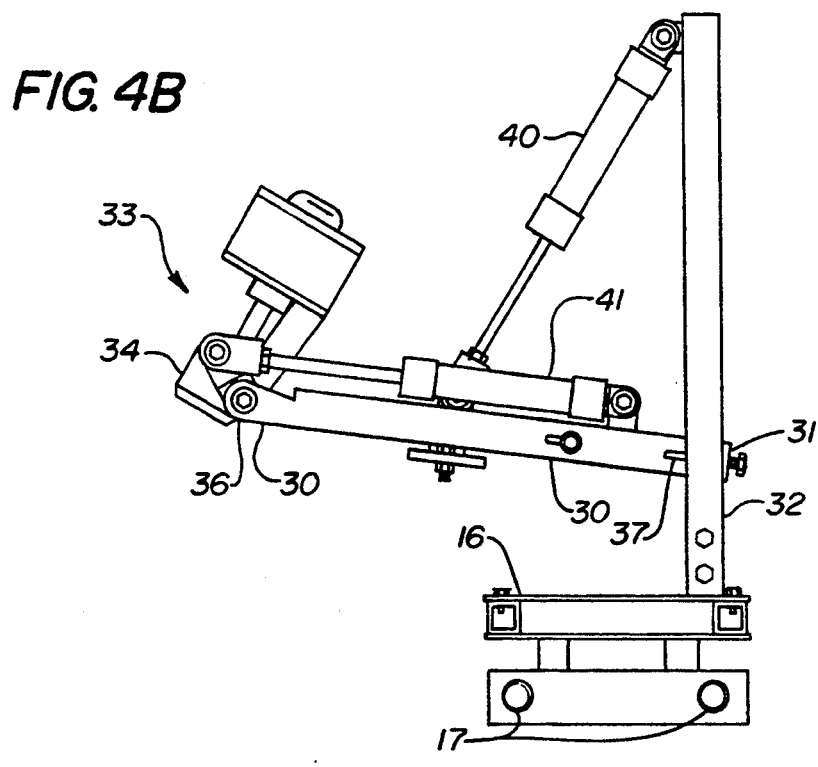
FIG. 4b is an elevation view of a shoulder separator assembly immediately prior to commencing a cut through the shoulder joint.

The method of attachment of the shoulder separator arm 30 to the support 32 allows a degree of "float" in the positioning of the shoulder separator arm 31. With reference to FIG. 4a, the shoulder separator arm 30 is provided with slots 37. A shoulder separator arm pivot rod 38 passes through the slots 37 and is rigidly affixed to the support 32. Springs 39 bear against both the shoulder separator arm 30 and the pivot rod 38 so as to allow the shoulder separator arm 30 to both translate and rotate slightly along the slots 37. This degree of "float" in the positioning of the shoulder separator arm 30 allows the cup knife 34 to accommodate slight variations in the anatomy of particular poultry carcasses.

A linear pneumatic actuator 40 is disposed between the shoulder separator arm 30 and the carriage 16. The linear pneumatic actuator 40 is thus able to place the shoulder separator arm 30 in a first position as exemplified by FIG. 4b in which the cup knife 34 is disposed away from the poultry carcass to a second position as exemplified in FIG. 4c in which the shoulder separator arm 30 is lowered to a position bringing the cup knife 34 in proximity to the poultry carcass shoulder joint. The motion of the shoulder separator arm 30 is substantially in a plane perpendicular to the direction of motion of the moving conveyor 10.

A second linear pneumatic actuator 41 is disposed between the shoulder separator arm 30 and an offset arm 42 which is rigidly attached to the cup knife assembly 33. The second linear pneumatic actuator 41 is thus able to move the cup knife assembly 33 rotationally between a first position as exemplified in FIG. 4b to a second position as exemplified in FIG. 4c. The rotation of the cup knife assembly 33 is substantially in a plane perpendicular to the direction of motion of the moving conveyor 10.

With reference to FIG. 4d, the cup knife 34 is provided with a cutting edge 43. The cutting edge 43 is characterized by an external bevel 44 and an internal bevel 45 to the cylinder 46 which forms the body of the cup knife 34. The bevels 44, 45 are relatively shallow so as to form a broadly wedge-shaped cross section for the cutting edge 43. The broad wedge-shaped cutting edge 43 thus acts both to cut apart tissues and tendons in the vicinity of the shoulder joint of the poultry carcass and also performs a wedging function to wedge the ball and socket components of the shoulder joint apart. The action of the cup knife 34 in cutting apart the shoulder joint 47 of the poultry carcass 28 is described with reference to FIGS. 5a, 5b and 5c. By the action of the linear pneumatic actuator 40, the shoulder separator arm 30 is lowered to bring the cup knife 34 in contact with the poultry carcass 28 as shown in FIG. 5a. The cup knife 34 is initially disposed as shown in FIG. 5a. The second linear pneumatic actuator 41 acts to rotate the cup knife assembly 33 so as to bring the cup knife 34 through the shoulder joint as shown in FIG. 5b to a final position as shown in FIG. 5c wherein the shoulder joint is cut and wedged apart by the action of the cup knife 34 and in addition the flesh and tendons in the vicinity of the shoulder joint are severed. Following the separation operation, the shoulder joint assembly 13 returns to its initial position as exemplified by FIG. 4b.

Following the shoulder separation operation, the mandrel 11 with the poultry carcass 28 disposed thereon is advanced by the moving conveyor 10 to the scapula knife assembly 14. The scapula knife assembly 14 is described with reference to FIGS. 6a through 6e. The scapula knife assembly 14 is mounted to the carriage 16 for sliding motion on the slide rods 17 in synchronization with the motion of the poultry carcass 28 along the moving conveyor 10. The shoulder separator assembly 13 and the scapula knife assembly 14, by virtue of being mounted on the carriage 16, move in synchronization to each other. The spacing between the shoulder separator assembly 13 and the scapula knife assembly 14 are such as to allow each to operate on consecutive poultry carcasses 28 simultaneously. By synchronizing the shoulder separation operation and the scapula knife operation with the motion of the moving conveyor 10, the moving conveyor 10 may operate at a constant speed without reference to the separate operations being performed on the poultry carcass in succession as it moves along the moving conveyor 10. The means for moving the carriage 16 in synchronization with the moving conveyor 10 will be described more fully below.

The scapula knife 48 is a straight fixed blade mounted to a first end 49 of a scapula knife arm 50. A second end 51 of the scapula knife arm is rigidly affixed to the transverse pivot rod 52.

The transverse pivot rod 52 is mounted in pivot rod blocks 53 allowing both rotational motion and transverse sliding motion of the transverse pivot rod 52. A pivot rod offset arm 54 is rigidly affixed to the transverse pivot rod 52. A pivotal linear pneumatic actuator 55 is connected between the carriage 16 and the pivot rod offset arm 54. A transverse linear pneumatic actuator 56 acts on the pivot rod 52 so as to transversely move the pivot rod 52 and thus the scapula knife arm 50 and the scapula knife 48 between an extended position as exemplified in FIGS. 6d and 6e in which the scapula knife 48 is disposed in line with the scapula bone of the poultry carcass 28 as it passes along the moving conveyor 10 and a disengaged position out of line with the poultry carcass 28 as exemplified by FIG. 6c.

The operation of the scapula knife 48 when in the extended position is described with reference to FIGS. 7a and 7b. The scapula knife 48 is positioned so as to cut down along the scapula bone thereby partly separating the breast from the poultry carcass. Proper positioning of the scapula knife 48 acts to sever certain major tendons which tend to bind the poultry breast more closely to the poultry carcass. By severing these tendons the subsequent breast separation operation is more easily accomplished and a greater degree of efficiency in removal of usable meat is achieved. The scapula knife 48 is brought into the cutting position by the action of the pivoting linear pneumatic actuator 56 acting against the offset arm 54. The rotation of the pivot rod 52 by the actuator 55 causes the scapula knife arm 50 to move between a first position as exemplified by FIG. 7a to a second position as exemplified by FIG. 7b. Once the cutting motion has been accomplished, the scapula knife 48 is retracted out of the path of the poultry carcass 28 so as to avoid cutting too deeply and thereby sacrificing a portion of useable meat.

Figure 4E:
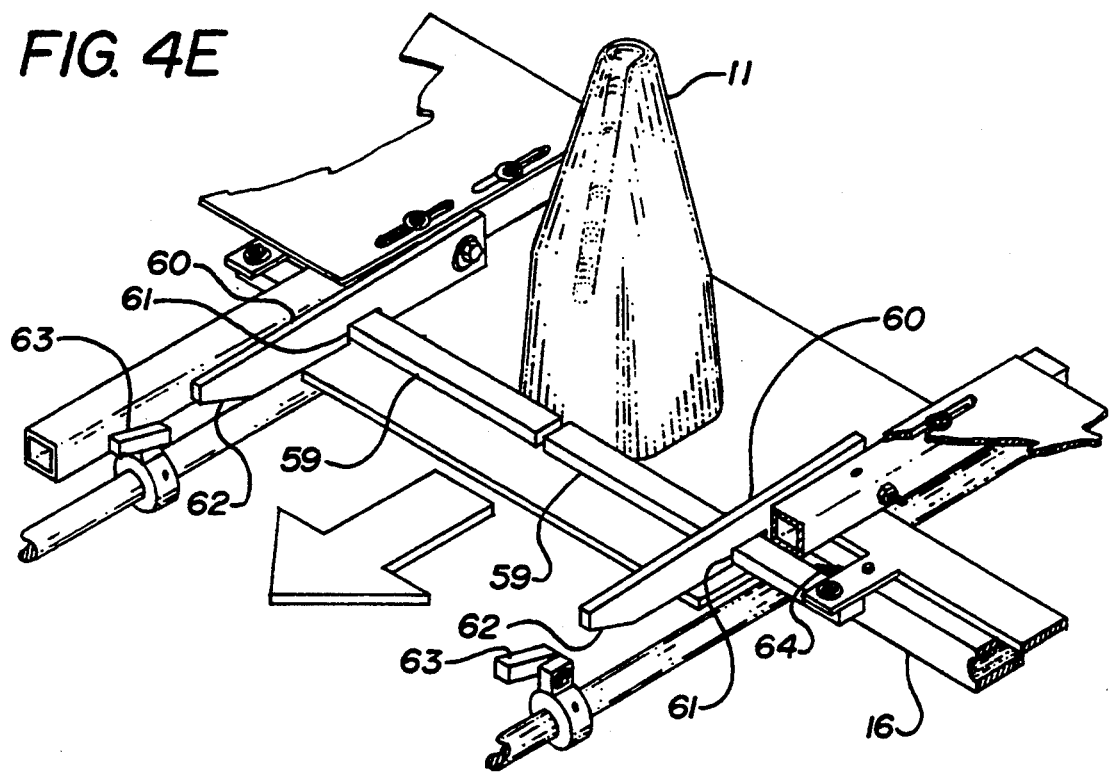
FIG. 4e is a perspective view of the mechanism for advancing the carriage in synchronization with the mandrel.

As mentioned previously, the shoulder separator assembly 13 and the scapula knife assembly 14 are mounted on the carriage 16 for synchronous movement with the moving conveyor 10. The mechanism for accomplishing the synchronization is described with reference to FIG. 4e. As each mandrel 11 approaches the shoulder separator assembly, a pair of swinging arms 59 intercept the mandrel 11. The swinging arms 59 are pivotally attached to the carriage 16. The swinging arms 59 are held in position by locking bars 60. Each locking bar 60 is provided with a notch 61 which engages and fixes the swinging arms in position so that the mandrel 11 as it is advanced by the moving conveyor 10 pushes against the swinging arms 59 and thereby, due to the attachment of the swinging arms 59 to the carriage 16, causes the carriage 16 to be advanced along the slide rods 17 in the direction of motion of the mandrel 11. The carriage 16 continues to move in synchronization with the mandrel 11 while the shoulder joint separator operations and scapula knife operations are performed on successive poultry carcasses 28. Upon completion of these operations, the locking bars 60 are disengaged from the swinging arms 59 by the following mechanism. Each locking bar 60 is pivotally mounted to the carriage 16. Each locking bar 60 is also equipped with a sloping nose 62. Ramps 63 are located in fixed positions along the moving conveyor 10. When the sloping nose 62 of the locking bar 60 encounters the fixed ramp 63, the locking bars 60 are forced upwards thereby releasing the swinging arms 59. The swinging arms 59 swing out of the path of the mandrel 11 thereby releasing the carriage 16 to return to its initial position to encounter the next mandrel 11 in succession. The carriage return may be accomplished by springs, pneumatic actuators or similar mechanisms.

As each mandrel 11 is released by the swinging arms 59, the swinging arms 59 are biased by springs 64 to return to a position to intercept the succeeding mandrel 11. Upon returning to the intercept position, the locking arms 60 fall into position and the cycle is ready to repeat.

Figure 8A:
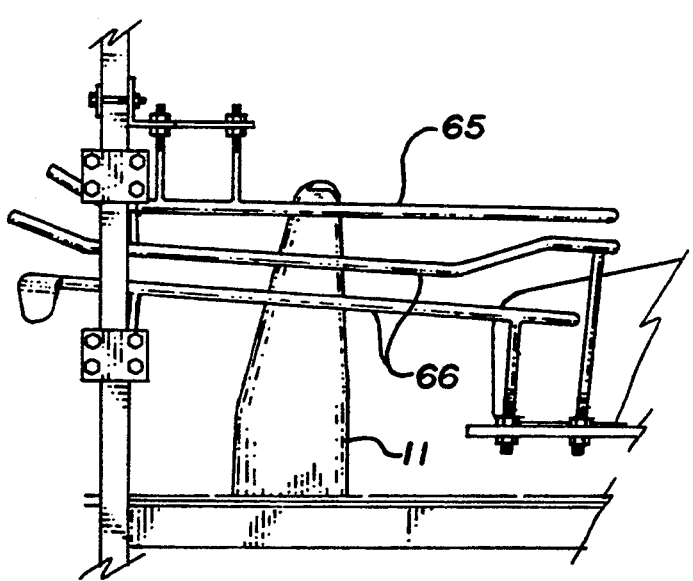
FIG. 8a is a side elevation of the guide bars.
Figure 8B:
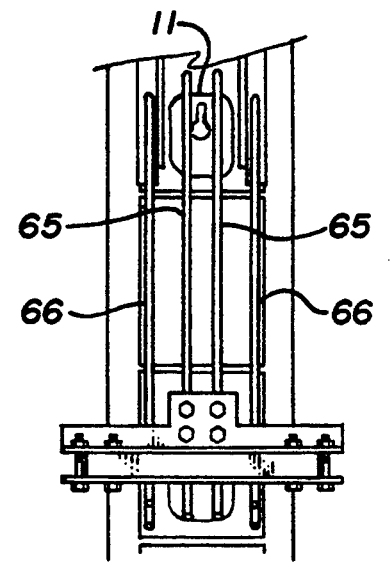
FIG. 8b is a plan view of the guide bars.
Figure 6A:
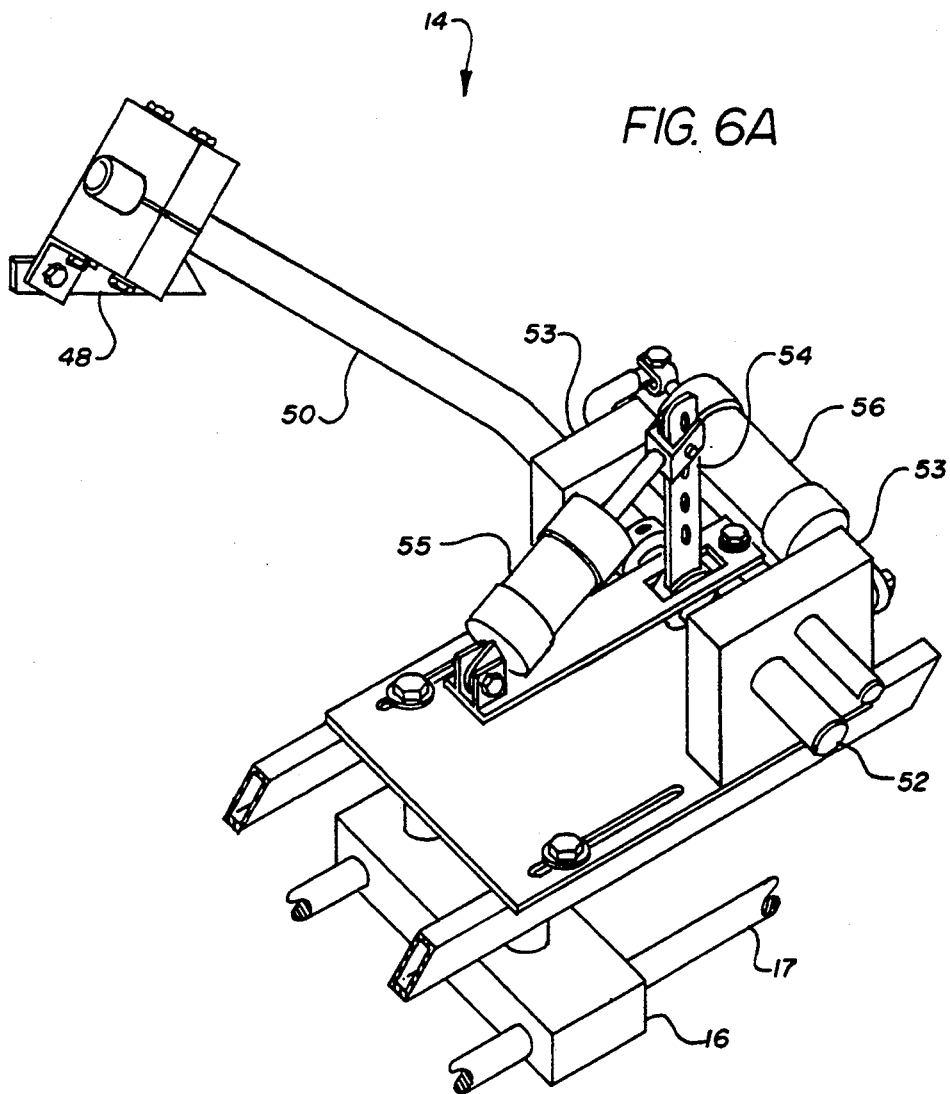
FIG. 6a is a perspective view of the scapula knife assembly.
Figure 6B:
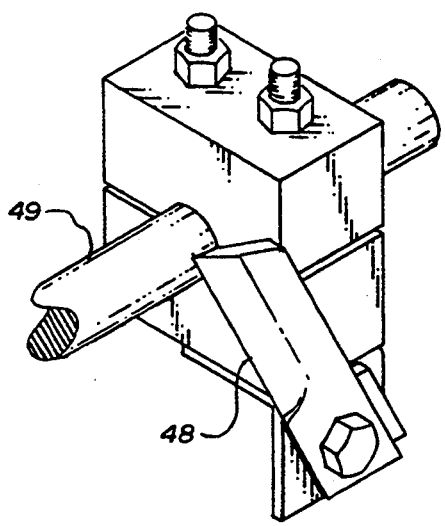
FIG. 6b is a partial perspective of the scapula knife.
Figure 6C:
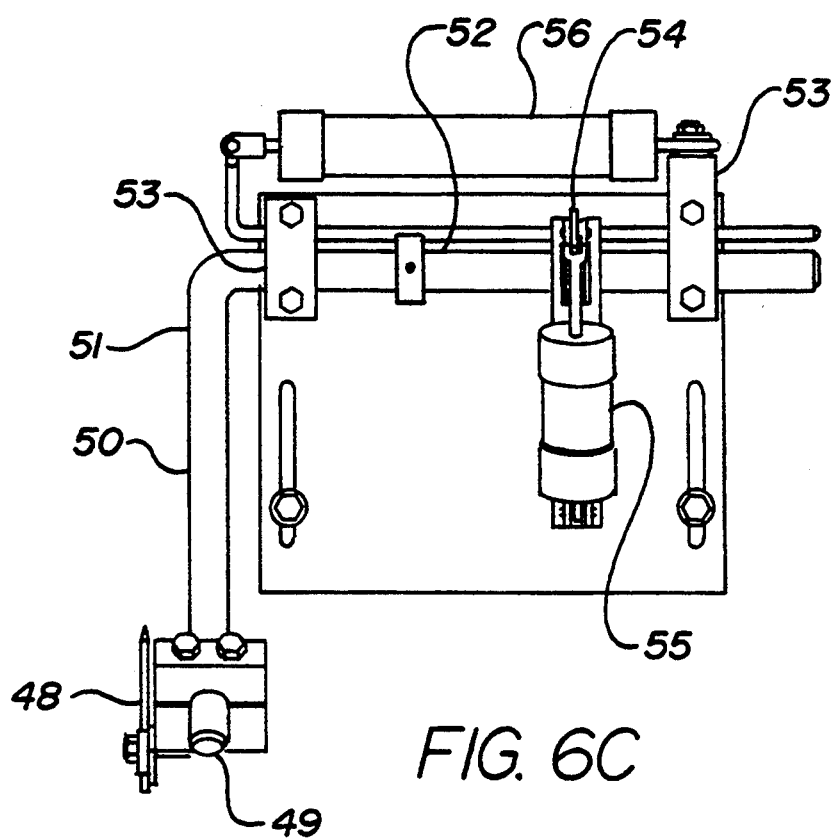
FIGS. 6c, 6d and 6e are plan views of the scapula knife assembly showing the scapula knife positioned to make a cut along side the scapula bone, showing the scapula knife after having made a cut along the scapula bone and showing the scapula knife assembly withdrawn from the path of the poultry carcass.
Figure 6D:
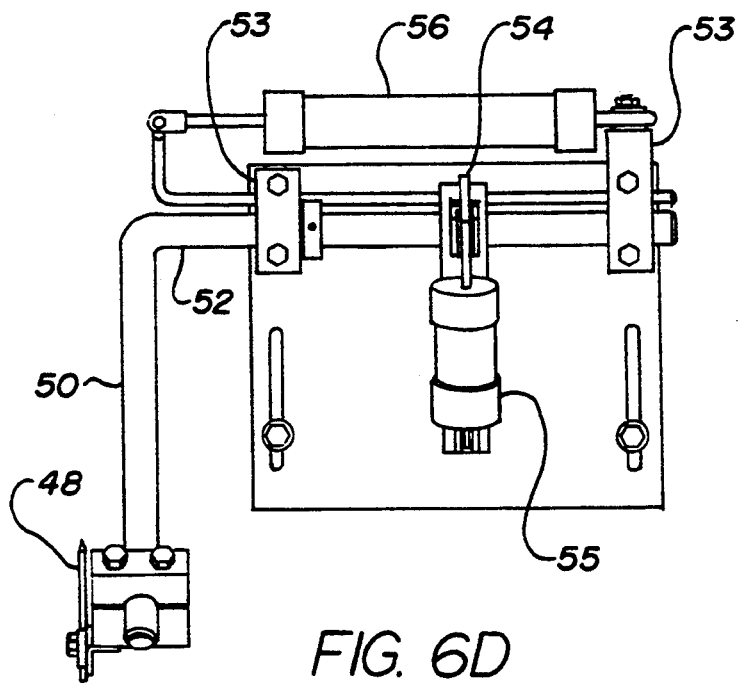
Figure 6E:
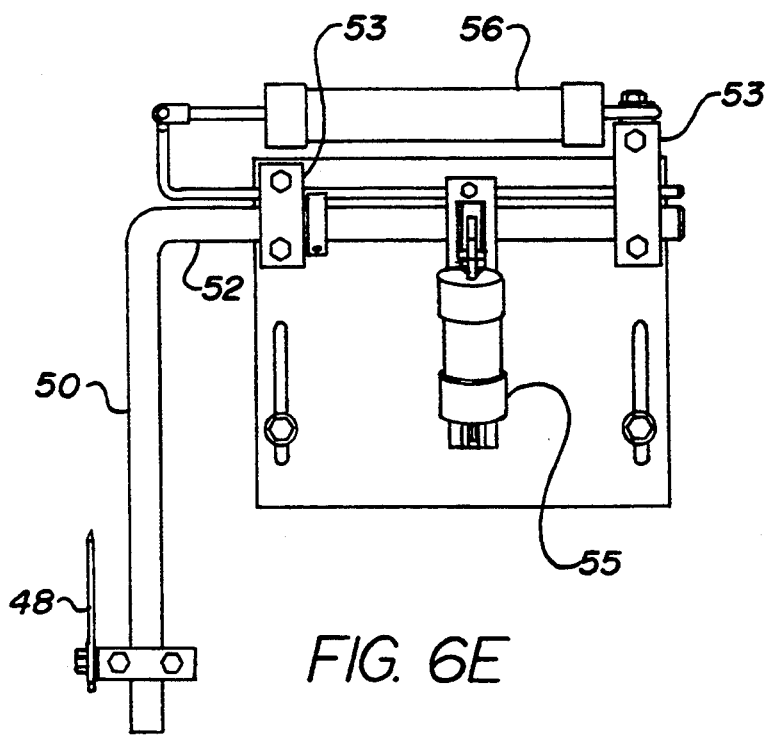
Figure 9A:
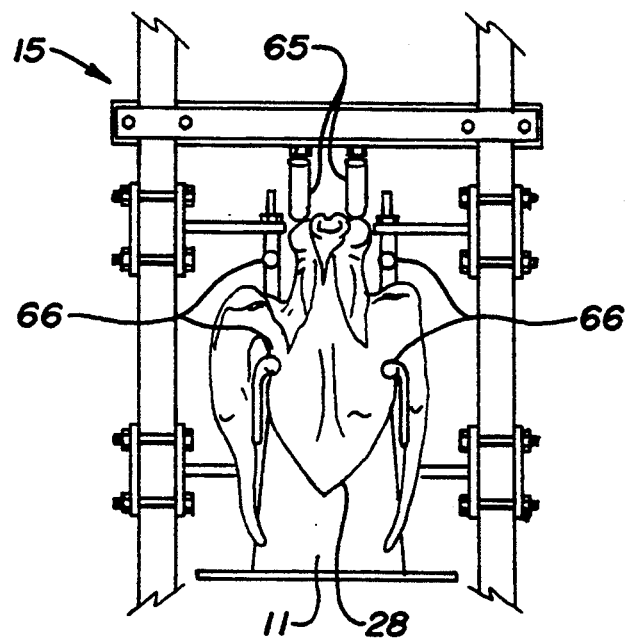
FIGS. 9a, 9b and 9c are sequential front elevation views of a poultry carcass on a mandrel as the wings are received between the guide bars and pulled down to partially tear the breast away from the poultry carcass.
Figure 9B:
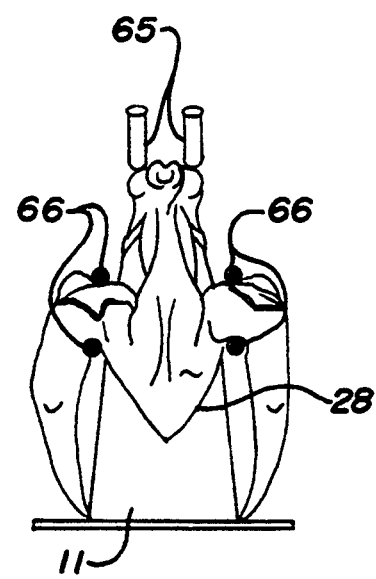
Figure 9C:
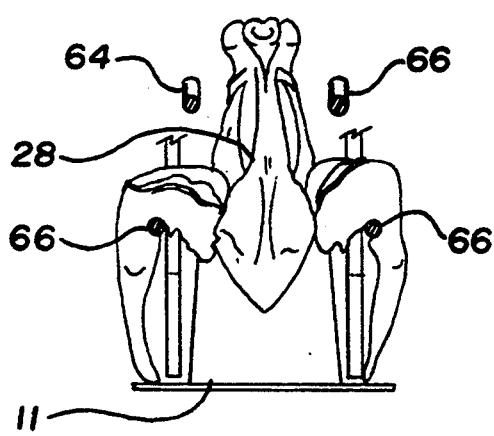

Following the scapula knife operation, the poultry carcass 28 enters the wing and breast separator assembly 15 which is described with reference to FIGS. 8a and 8b. The wing and breast separator assembly 15 begins the process of separating the wing and breast from the poultry carcass in a manner that ensures maximum removal of meat from the carcass. The final separation of the wing and breast from the carcass is accomplished by prior art methods that follow the wing and breast separator assembly 15. The prior art method of tearing the breast away from the carcass often left a substantial amount of meat attached to the carcass. In particular the flesh around the wishbone and the portion known as the "eye" tended to be left on the carcass rather than to be removed with the breast.

The wing and breast separator assembly 15 comprises a pair of hold down bars 65 which are disposed in a substantially horizontal fashion in line with the motion of the moving conveyor 10. The hold down bars 65 are positioned so as to apply light pressure on the flesh of the poultry carcass 28 so as to hold the poultry carcass 28 in position on the mandrel 11 during the wing and breast separation operation. In addition the pressure of the hold down bars 65 on the flesh in the vicinity of the wishbone forces this flesh to pull away from the wishbone and thereby contributes to good meat release. The "eye" resides in a hole in the carcass under the wing. Manual cutting as practiced in the prior art usually resulted in leaving the "eye" in this hole. In the present invention all cuts are made above the position of the "eye." The "eye" is therefore removed along with the breast.

The wing and breast is partially separated by a pair of complementary guide bars 66 on either side of the poultry carcass 28. The guide bars 66 are spaced apart so as to receive the wing of the poultry carcass therebetween. The guide bars 66 are, however, spaced such that while the wing of the poultry carcass 28 is allowed to slide between the guide bars 66, the wing is restrained to move between the guide bars 66 as the poultry carcass 28 is advanced along the moving conveyor 10. The guide bars 66 are angled away from the poultry carcass so that as the poultry carcass 28 advances, the wing and attached breast is pulled away from the poultry carcass 28. This action results in partially tearing away fleshy connections between the breast and the poultry carcass. At the end of this operation the wing and attached breast have been partially separated from the poultry carcass. The final separation of the wing and attached breast portion is accomplished by methods known in the prior art. The wing and attached breast may then be further processed. The poultry carcass may also be further processed to remove the tenders lying along the keel bone of the poultry carcass.

While the method and apparatus of the present invention have been described with reference to certain preferred embodiments, they are exemplary and not by way of limitation to the full scope of the present invention as set forth in the appended claims.

What is claimed is:

1. An apparatus for partially separating a wing and attached breast from a poultry carcass having at least a shoulder joint and a scapula bone and being disposed upright on a mandrel carried on a moving conveyor, comprising one or more shoulder joint separator assemblies, comprising:
    (a) a rotating cylindrical cup knife;
    (b) means for rotatably driving said cup knife;
    (c) means for positioning said cup knife in a shoulder joint and for moving said cup knife through the joint so as to separate the wing from the poultry carcass at the joint and further to sever tendons and flesh in the vicinity of the joint without completely severing all fleshy connections between the poultry carcass and the breast;
    (d) means for advancing said shoulder joint separator assemblies from a start point in synchronization with the mandrel on the moving conveyor while the shoulder joint is being separated; and
    (e) means for returning said shoulder joint separator assemblies to said starting point upon completion of separation of the shoulder joint.

2. The apparatus of claim 1 further comprising one or more prescore assemblies for scoring the shoulder joint in advance of said shoulder joint separator assemblies, comprising:
    (a) a prescore knife positioned to score the shoulder joint as the poultry carcass is advanced by the moving conveyor;
    (b) means for locating and guiding the shoulder joint to said prescore knife; and
    (c) means for terminating contact between said prescore knife and the poultry carcass.

3. The apparatus of claim 1 or 2 further comprising one or more scapula knife assemblies following said shoulder joint separator assemblies, comprising:
    (a) a scapula knife;
    (b) means for positioning said scapula knife so as to sever tendons connecting the breast to the poultry carcass and to separate the breast portion from the scapula bone without completely separating the breast from the poultry carcass; and
    (c) means for terminating contact between said scapula knife and the poultry carcass.

4. The apparatus of claim 3 further comprising means following said scapula knife assemblies for gripping the wing and partially tearing the wing and attached breast from the poultry carcass.

5. The apparatus of claim 1 wherein said cup knife is provided with a cutting edge defined by an internal bevel and an external bevel, said internal bevel and said external bevel each being characterized by a shallow angle such that said cutting edge has a cross-sectional profile that is broadly wedge-shaped.

6. The apparatus of claim 5 wherein said means for advancing said shoulder joint separator assemblies comprises a carriage adapted for sliding motion parallel to said moving conveyor and having said shoulder joint separator assemblies rigidly affixed to said carriage, a pair of swinging arms pivotally attached to said carriage and positioned so as to intercept the mandrel on the moving conveyor such that said carriage is constrained to move in synchronization with said mandrel, means to lock said swinging arms while the shoulder joint is separated by said cup knife, and means to release said swinging arms upon completion of separation of the shoulder joint by said cup knife.

7. The apparatus of claim 6 wherein said means for positioning said cup knife in a shoulder joint and for moving said cup knife through the joint comprises a cup knife arm having a first end and a second end, and a cup knife assembly comprising said cup knife and said means for rotatably driving said cup knife, said first end of said cup knife arm being pivotally coupled to said carriage for swinging motion in a plane perpendicular to said moving conveyor and said second end being pivotally coupled to said cup knife assembly for rotating motion of said cup knife in said plane, means for swinging said cup knife arm between a first position such that said cutting edge of said cup knife is positioned adjacent to said joint and a second position clear of said poultry carcass, and means to rotate said cup knife assembly through said joint.

8. The apparatus of claim 2 wherein said means for locating and guiding the shoulder joint to said prescore knife comprises a guide block having a milled recess characterized by a wide entry area and a narrow exit area and positioned so as to receive the shoulder joint within said entry area and to guide the shoulder point to the exit area as the poultry carcass is advanced by the moving conveyor and further wherein said prescore knife is attached to said guide block so as to score the shoulder joint while the shoulder joint is positioned by said exit area.

9. The apparatus of claim 8 wherein said prescore knife is a rotary disc knife.

10. The apparatus of claim 3 wherein said means for positioning said scapula knife comprises a transverse slide attached to said carriage, a scapula knife assembly pivotally attached to said transverse slide for swinging motion of said scapula knife in a vertical plane, means for transverse motion of said transverse slide, and means for swinging motion of said scapula knife assembly.

11. The apparatus of claim 4 wherein said means for partially gripping and tearing comprises one or more holding bars positioned so as to apply light pressure to the flesh of the breast and to hold the poultry carcass onto the mandrel as the wing and attached breast are partially torn from the poultry carcass and a pair of guide bars adapted to receive the wing therebetween as the poultry carcass is advanced by the moving conveyor and to guide the wing away from the poultry carcass thereby partially tearing the breast including the eye and flesh in the vicinity of the wishbone from the poultry carcass.

12. The apparatus of claim 9 further wherein:
said cup knife is provided with a cutting edge defined by an internal bevel and an external bevel, said internal bevel and said external bevel each being characterized by a shallow angle such that said cutting edge has a cross-sectional profile that is broadly wedge-shaped;
said means for advancing said shoulder joint separator assemblies comprises a carriage adapted for sliding motion parallel to said moving conveyor and having said shoulder joint separator assemblies rigidly affixed to said carriage, a pair of swinging arms pivotally attached to said carriage and positioned so as to intercept the mandrel on the moving conveyor such that said carriage is constrained to move in synchronization with said mandrel, means to lock said swinging arms while the shoulder joint is separated by said cup knife, and means to release said swinging arms upon completion of separation of the shoulder joint by said cup knife, and
said means for positioning said cup knife in a shoulder joint and for moving said cup knife through the joint comprises a cup knife arm having a first end and a second end, and a cup knife assembly comprising said cup knife and said means for rotatably driving said cup knife, said first end of said cup knife arm being pivotally coupled to said carriage for swinging motion in a plane perpendicular to said moving conveyor and said second end being pivotally coupled to said cup knife assembly for rotating motion of said cup knife in said plane, means for swinging said cup knife arm between a first position such that said cutting edge of said cup knife is positioned adjacent to said joint and a second position clear of said poultry carcass, and means to rotate said cup knife assembly through said joint.

13. The apparatus of claim 10 further wherein:
said cup knife is provided with a cutting edge defined by an internal bevel and an external bevel, said internal bevel and said external bevel each being characterized by a shallow angle such that said cutting edge has a cross-sectional profile that is broadly wedge-shaped,
said means for advancing said shoulder joint separator assemblies comprises a carriage adapted for sliding motion parallel to said moving conveyor and having said shoulder joint separator assemblies rigidly affixed to said carriage, a pair of swinging arms pivotally attached to said carriage and positioned so as to intercept the mandrel on the moving conveyor such that said carriage is constrained to move in synchronization with said mandrel, means to lock said swinging arms while the shoulder joint is separated by said cup knife, and means to release said swinging arms upon completion of separation of the shoulder joint by said cup knife,
said means for positioning said cup knife in a shoulder joint and for moving said cup knife through the joint comprises a cup knife arm having a first end and a second end, and a cup knife assembly comprising said cup knife and said means for rotatably driving said cup knife, said first end of said cup knife arm being pivotally coupled to said carriage for swinging motion in a plane perpendicular to said moving conveyor and said second end being pivotally coupled to said cup knife assembly for rotating motion of said cup knife in said plane, means for swinging said cup knife arm between a first position such that said cutting edge of said cup knife is positioned adjacent to said joint and a second position clear of said poultry carcass, and means to rotate said cup knife assembly through said joint,
said means for locating and guiding the shoulder joint to said prescore knife comprises a guide block having a milled recess characterized by a wide entry area and a narrow exit area and positioned so as to receive the shoulder joint within said entry area and to guide the shoulder point to the exit area as the poultry carcass is advanced by the moving conveyor and further wherein said prescore knife is attached to said guide block so as to score the shoulder joint while the shoulder joint is positioned by said exit area, said prescore knife is a rotary disc knife, said means for partially gripping and tearing comprises one or more holding bars positioned so as to apply light pressure to the flesh of the breast and to hold the poultry carcass onto the mandrel as the wing and attached breast are partially torn from the poultry carcass and a pair of guide bars adapted to receive the wing therebetween as the poultry carcass is advanced by the moving conveyor and to guide the wing portion away from the poultry carcass thereby partially tearing the breast including the eye and the flesh in the vicinity of the wishbone from the poultry carcass.

14. The apparatus of claim 11 further wherein:

said cup knife is provided with a cutting edge defined by an internal bevel and an external bevel, said internal bevel and said external bevel each being characterized by a shallow angle such that said cutting edge has a cross-sectional profile that is broadly wedge-shaped, said means for advancing said shoulder joint separator assemblies comprises a carriage adapted for sliding motion parallel to said moving conveyor and having said shoulder joint separator assemblies rigidly affixed to said carriage, a pair of swinging arms pivotally attached to said carriage and positioned so as to intercept the mandrel on the moving conveyor such that said carriage is constrained to move in synchronization with said mandrel, means to lock said swinging arms while the shoulder joint is separated by said cup knife, and means to release said swinging arms upon completion of separation of the shoulder joint by said cup knife, said means for positioning said cup knife in a shoulder joint and for moving said cup knife through the joint comprises a cup knife arm having a first end and a second end, and a cup knife assembly comprising said cup knife and said means for rotatably driving said cup knife, said first end of said cup knife arm being pivotally coupled to said carriage for swinging motion in a plane perpendicular to said moving conveyor and said second end being pivotally coupled to said cup knife assembly for rotating motion of said cup knife in said plane, means for swinging said cup knife arm between a first position such that said cutting edge of said cup knife is positioned adjacent to said joint and a second position clear of said poultry carcass, and means to rotate said cup knife assembly through said joint, said means for locating and guiding the shoulder joint to aid prescore knife comprises a guide block having a milled recess characterized by a wide entry area and a narrow exit area and positioned so as to receive the shoulder joint within said entry area and to guide the shoulder point to the exit area as the poultry carcass is advanced by the moving conveyor and further wherein said prescore knife is attached to said guide block so as to score the shoulder joint while the shoulder joint is positioned by said exit area, said prescore knife is a rotary disc knife, said means for positioning said scapula knife comprises a transverse slide attached to said carriage, a scapula knife assembly pivotally attached to said transverse slide for swinging motion of said scapula knife in a vertical plane, means for transverse motion of said transverse slide, and means for swinging motion of said scapula knife assembly.

15. A method for partially separating a wing and attached breast from a poultry carcass having at least a shoulder joint and a scapula bone and being disposed upright on a mandrel carried on a moving conveyor, comprising the steps of:

(a) scoring the shoulder joint;

(b) cutting through the shoulder joint so as to sever tendons and flesh in the vicinity of the shoulder joint without completely severing all fleshy connections between the poultry carcass and the breast portion;

(c) cutting along the scapula bone so as to separate the breast portion from the scapula bone without completely severing the breast portion from the poultry carcass; and (d) partially tearing the wing portion and attached breast portion including the eye and the flesh in the vicinity of the wishbone from the poultry carcass.

* * * * *